United States Patent
Toguchi et al.

(10) Patent No.: US 9,225,907 B2
(45) Date of Patent: Dec. 29, 2015

(54) IMAGE CAPTURING APPARATUS AND METHOD FOR CONTROLLING THE SAME

(71) Applicant: CANON KABUSHIKI KAISHA, Tokyo (JP)

(72) Inventors: Daisuke Toguchi, Kawasaki (JP); Hiroshi Yamazaki, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/177,915

(22) Filed: Feb. 11, 2014

(65) Prior Publication Data

US 2014/0240542 A1 Aug. 28, 2014

(30) Foreign Application Priority Data

Feb. 26, 2013 (JP) ................................. 2013-036205

(51) Int. Cl.
*H04N 5/232* (2006.01)

(52) U.S. Cl.
CPC ................................ *H04N 5/23293* (2013.01)

(58) Field of Classification Search
CPC ........................... H04N 5/232; H04N 5/23293
USPC .................................................... 348/231.99
See application file for complete search history.

(56) References Cited

U.S. PATENT DOCUMENTS

| 2006/0023079 | A1* | 2/2006 | Sugitani | 348/222.1 |
| 2007/0211153 | A1* | 9/2007 | Uchida et al. | 348/231.99 |
| 2011/0298962 | A1* | 12/2011 | Shiohara | 348/333.02 |
| 2012/0320177 | A1* | 12/2012 | Nishimura et al. | 348/65 |

FOREIGN PATENT DOCUMENTS

| JP | 2007-243615 A | 9/2007 |
| JP | 2011-211507 A | 10/2011 |

* cited by examiner

*Primary Examiner* — Gevell Selby
(74) *Attorney, Agent, or Firm* — Cowan, Liebowitz & Latman, P.C.

(57) ABSTRACT

In an image capturing apparatus, a generation unit performs image processing to generate a synchronizing signal for an image sensor, an image generation unit generates image data using an electric signal obtained from the image sensor, and a display control unit reads out the image data stored in a storage unit and displays it on a display unit. The generation unit controls a phase of the synchronizing signal such that the display processing starts when the image processing for a predetermined volume of image data is finished if a frame period (first period) of the image sensor is shorter than a frame period (second period) of the display control unit, and that a predetermined volume of unprocessed image data is left in the storage unit when the image processing for one frame is finished if the first period is not shorter than the second period.

11 Claims, 5 Drawing Sheets

IMAGE CAPTURING APPARATUS AND METHOD FOR CONTROLLING THE SAME

BACKGROUND OF THE INVENTION

1. Field of the Invention

The present invention relates to an image capturing apparatus and a method for controlling the image capturing apparatus, and more specifically to an image capturing apparatus that displays a live view of image data of an object generated by an image sensor on a display unit, and a method for controlling the image capturing apparatus.

2. Description of the Related Art

Conventionally, a digital camera serving as an image capturing apparatus is equipped with an image sensor, such as a CMOS image sensor, and a display unit, such as an LCD (liquid crystal display). Image data of an object that is generated at a predetermined frame rate by an image sensor is displayed in a display mode (live view display) in which the image data is displayed in real time on the display unit, thereby enabling a photographer to perform photographing while viewing the display unit.

The display unit, which in general operates asynchronously with the image sensor, stores the image data obtained by the image sensor in a memory, and thereafter reads out the image data from the memory and outputs the image data to the display unit synchronously with driving of the display unit. At this time, if the image data is read out after all image data for one frame obtained by the image sensor is written, a delay of one frame or longer will occur after the timing of photographing an object with the image sensor until the image data is displayed on the display unit. This leads to a problem in that the photographer cannot capture a still image of his/her intended moment.

For solution to the aforementioned problem, a method for synchronizing an image sensor with a display system for displaying image data on a display unit is known. For example, Japanese Patent Laid-Open No. 2011-211507 discloses a method for causing processing times of an image sensor, an image processing circuit, and a flat panel display to coincide with one another by applying a dummy pulse to a synchronizing signal for a relatively short processing time among these processing times so as to conform to the longest processing time among them.

Japanese Patent Laid-Open No. 2007-243615 discloses a method for controlling timing as follows when an image signal that is output from an image sensor is written to a storage unit and then the image signal is read out from the storage unit and output to a display unit. That is to say, the control is performed for synchronizing a timing of driving the image sensor with a timing of starting to read out the image signal by shifting these timings by a phase difference such that the image signal is read out from the storage unit and output to the display unit before writing to the storage unit for one frame is completed.

However, in the above-described conventional techniques, a consideration is not given to the length correlation between the processing times of the image sensing system and the display system.

Firstly, with the technique of Japanese Patent Laid-Open No. 2011-211507, if the processing time of the flat panel display is relatively fast, a dummy pulse is inserted with respect to the synchronizing signal, which is defined by a video signal standard, such as NTSC. For this reason, a problem arises in that a signal that does not conform to the video signal standard is output, and a correct image is not displayed.

On the other hand, with the technique of Japanese Patent Laid-Open No. 2007-243615, synchronization is performed by the method for shifting the start of writing of the image signal to the storage unit and the start of reading of the image signal from the storage unit by a phase difference. Furthermore, the synchronizing signal is generated such that the timing of starting to read out the image signal from the storage unit and the timing of starting to drive the image sensor have a predetermined phase difference. However, with the method described in Japanese Patent Laid-Open No. 2007-243615, if the time taken to write the image signal to the storage unit is longer than the time taken to read out the image signal from the storage unit, the reading of the image signal may possibly be completed even though the writing of the image signal has not been completed. In this case, the image is displayed on the display unit with a delay for one frame, causing occurrence of display delay.

SUMMARY OF THE INVENTION

The present invention has been made in consideration of the above situation, and shortens a delay time from when an image sensor generates image data of an object until when the image data is displayed, in accordance with a length correlation between processing times of an image sensing system and a display system.

According to the present invention, provided is an image capturing apparatus comprising: an image sensor configured to convert received light into an electric signal; a generation unit configured to generate a synchronizing signal for driving the image sensor; an image generation unit configured to perform image processing for generating image data using the electric signal obtained from the image sensor; a storage unit configured to store the image data; a display unit; and a display control unit configured to perform display processing for reading out the image data stored in the storage unit and displaying the image data on the display unit, wherein the generation unit controls a phase of the synchronizing signal for the image sensor such that the display processing is started at a timing of the image generation unit performing the image processing on a predetermined volume of image data, in a case where a first period that is a frame period of the image sensor is shorter than a second period that is a frame period of the display control unit, and controls the phase of the synchronizing signal for the image sensor such that a predetermined volume of image data that has not been processed by the display control unit is left in the storage unit when the image processing for one frame is finished by the image generation unit, in a case where the first period is longer than or equal to the second period.

Further, according to the present invention, provided is a method for controlling an image capturing apparatus including: an image sensor configured to convert received light into an electric signal; a generation unit configured to generate a synchronizing signal for driving the image sensor; an image generation unit configured to perform image processing for generating image data using the electric signal obtained from the image sensor; a storage unit configured to store the image data; a display unit; and a display control unit configured to perform display processing for reading out the image data stored in the storage unit and displaying the image data on the display unit, the method comprising: a step of controlling a phase of the synchronizing signal for the image sensor such that the display processing is started at a timing of the image generation unit performing the image processing on a predetermined volume of image data, in a case where a first period that is a frame period of the image sensor is shorter than a second period that is a frame period of the display control unit, by the generation unit; and a step of controlling the phase of the synchronizing signal for the image sensor such that a predetermined volume of image data that has not been processed by the display control unit is left in the storage unit when the image processing for one frame is finished by the image generation unit, in a case where the first period is longer than or equal to the second period, by the generation unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
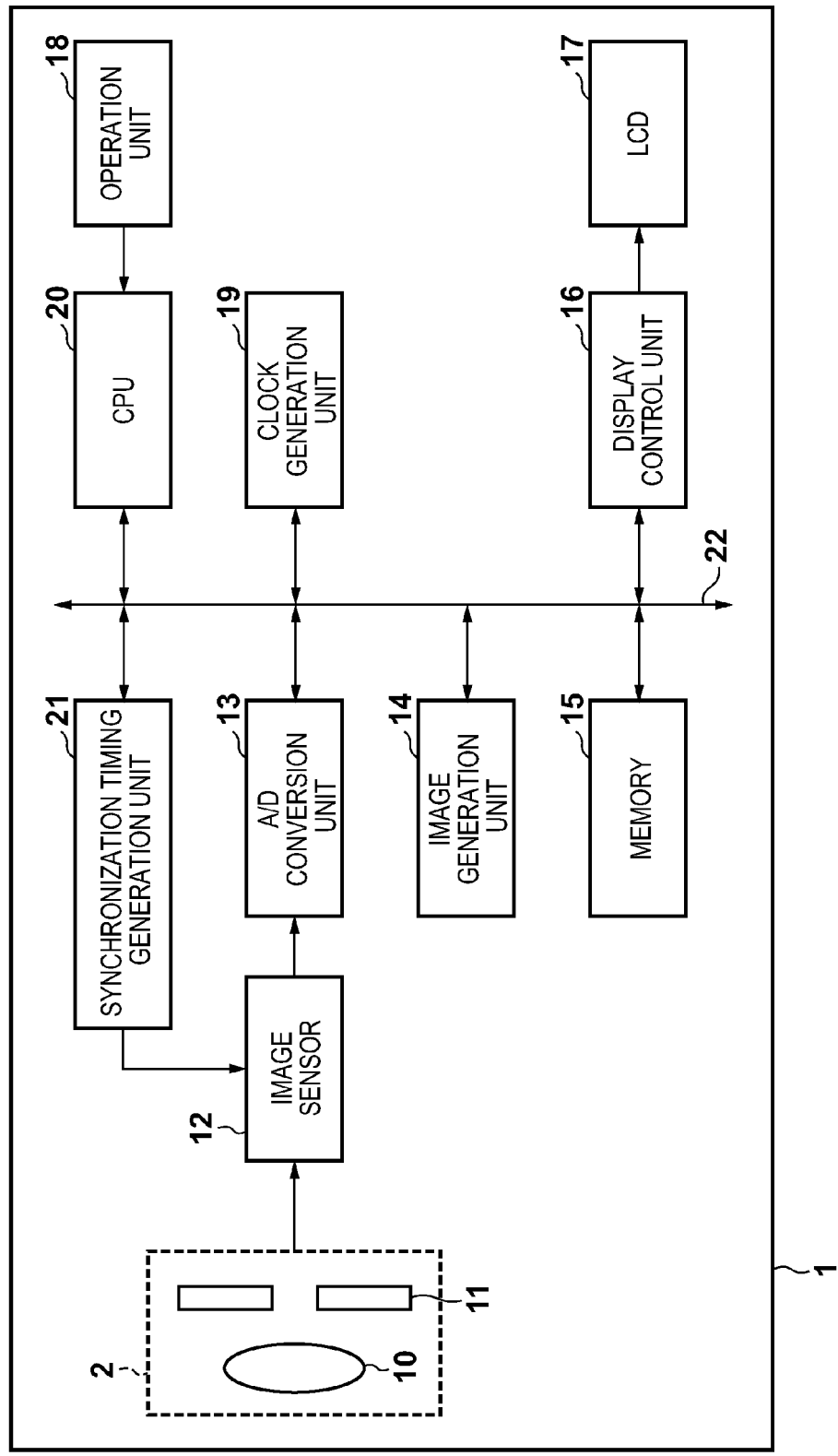
FIG. 1 is a block diagram showing a configuration of an image capturing apparatus according to an embodiment of the present invention.

Exemplary embodiments of the present invention will be described in detail in accordance with the accompanying drawings. FIG. 1 is a block diagram showing a configuration of a digital camera 1 as an example of an image capturing apparatus according to an embodiment of the present invention. In the present embodiment, in the configuration shown in FIG. 1, an image sensor 12, an A/D conversion unit 13, an image generation unit 14, and a memory 15 constitute an image sensing system, and the memory 15, a display control unit 16, and an LCD 17 constitute a display system.

The image sensor 12 is driven by a synchronizing signal generated by a synchronization timing generation unit 21, converts light received via an image sensing optical system 2, which includes a lens 10 and a diaphragm 11, into an electric signal, and outputs the converted electric signal to the A/D conversion unit 13. The A/D conversion unit 13 converts an analog signal that is output from the image sensor 12 into a digital signal, and outputs the digital signal to the image generation unit 14. The image generation unit 14 performs development processing on the digital signal obtained by the A/D conversion unit 13, generates image data, and writes the image data to the memory 15.

The display control unit 16 is driven by a synchronizing signal generated by a CPU 20, reads out the image data written by the image generation unit 14 from the memory 15, and outputs the read image data to the LCD 17. The LCD 17 displays the data that is output from the display control unit 16. Note that live view display can be obtained by sequentially displaying image data of every frame, which is obtained by the image sensor 12 periodically performing photographing, on the LCD 17.

An operation unit 18 comprises a mode button, a release button, and the like. The operation unit 18 outputs a drive mode of the image sensor 12 specified from a photographing mode selected by a user operation, and an identification signal (hereinafter referred to as a "mode signal") based on a display format such as NTSC or PAL, which is a video signal standard, to the CPU 20.

A clock generation unit 19 generates a clock signal that is used in both the image sensing system and the display system. The CPU 20 and the synchronization timing generation unit 21 generate the synchronizing signal, based on this clock signal.

The CPU 20 holds periods of horizontal and vertical synchronizing signals for the image sensing system and the display system corresponding to each photographing mode and display format, in the form of a table, and determines frame rates of the image sensing system and the display system based on a mode signal from the operation unit 18. Further, the CPU 20 generates a display system synchronizing signal based on the periods of the horizontal and vertical synchronizing signals for the display system and input of a clock to the display system by the clock generation unit 19, and outputs the display system synchronizing signal to the display control unit 16. Furthermore, the CPU 20 calculates processing time of the image generation unit 14 from the timing of starting processing in the image generation unit 14 and a complete interrupt for the writing to the memory 15 that is output from the image generation unit 14, both being generated synchronously with the image sensing system synchronizing signal, and compares the calculated processing time with processing time of the display system. Note that the specific method for calculating the processing time will be described later in the description of a processing time calculation unit 102. The CPU 20 then obtains a phase difference that the image sensing system synchronizing signal has with respect to the display system synchronizing signal, based on the comparison result, and outputs the comparison result and the phase difference to the synchronization timing generation unit 21. The details will be described later with reference to FIG. 2.

The synchronization timing generation unit 21 generates the image sensing system synchronizing signal based on a clock from the clock generation unit 19. At this time, the synchronization timing generation unit 21 receives, from the CPU 20, the result of the comparison between the processing time of the image generation unit 14 and the processing time of the display system, and the phase difference that the image sensing system synchronizing signal has with respect to the display system synchronizing signal. Then, the synchronization timing generation unit 21 determines a reference timing (hereinafter referred to as a "synchronizing reference") for synchronizing the image sensor 12 with the display system, and generates an image sensing system synchronizing signal by shifting the synchronizing reference by the phase difference. Note that the details of the synchronization timing generation unit 21 and the CPU 20 will be described later with reference to FIG. 2, and the method for calculating the phase difference and the method for determining the synchronizing reference will be described later with reference to FIG. 5.

The A/D conversion unit 13, the image generation unit 14, the memory 15, the display control unit 16, the clock generation unit 19, and the synchronization timing generation unit 21 are connected to a bus 22 and controlled by the CPU 20, and thus, data transfer among them is enabled.

Figure 2:
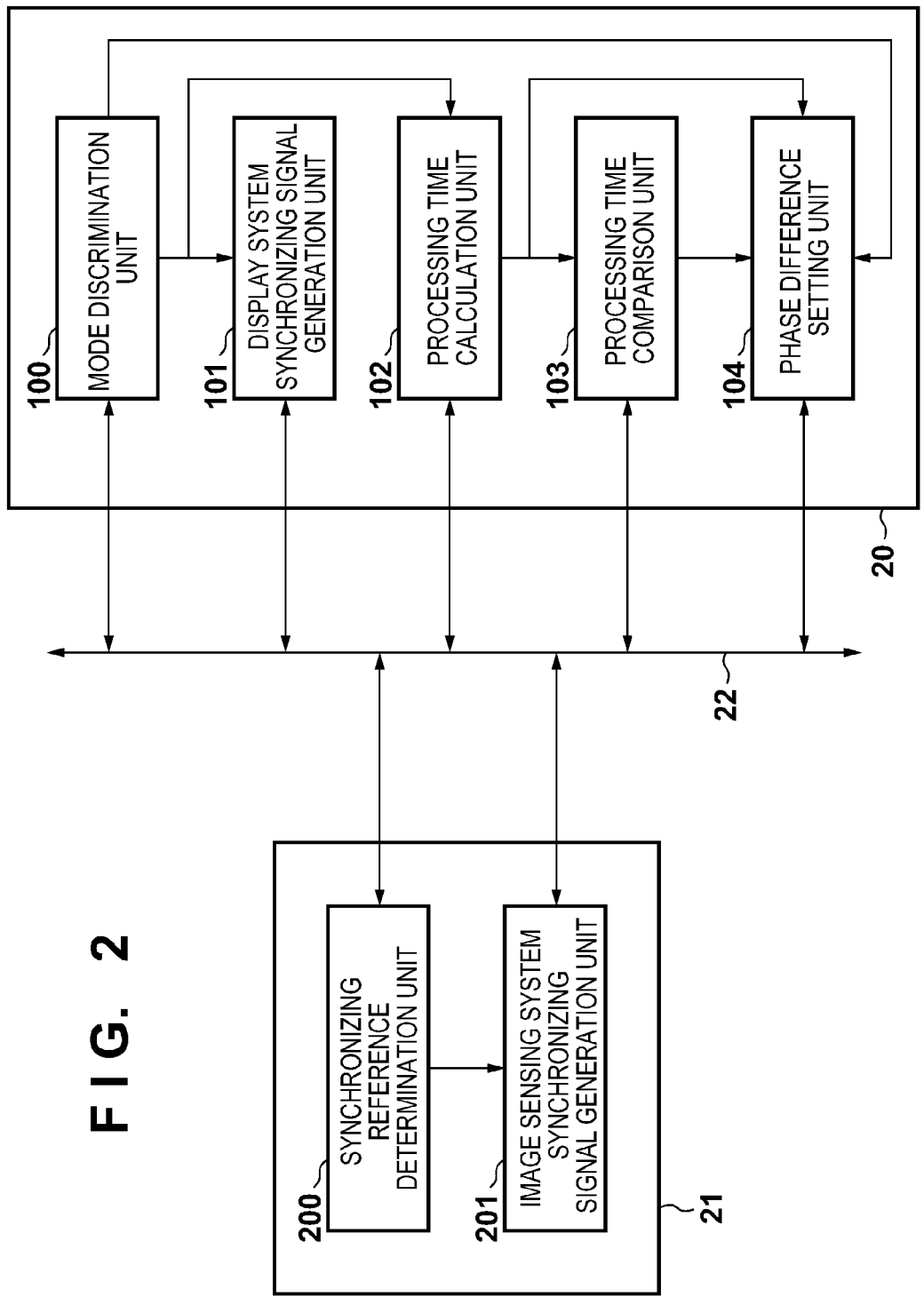
FIG. 2 is a block diagram showing an internal configuration of a CPU and a synchronization timing generation unit.

FIG. 2 is a block diagram showing an internal configuration of the CPU 20 and the synchronization timing generation unit 21. A mode discrimination unit 100 in the CPU 20 discriminates the current drive mode of the image sensor 12 and display format of the LCD 17, based on the mode signal that is output from the operation unit 18. Then, the mode discrimination unit 100 reads out the periods of the horizontal and vertical synchronizing signals for the image sensing system and the display system from the table that is prepared in advance, in accordance with the discrimination result.

A display system synchronizing signal generation unit 101 generates a display system synchronizing signal by dividing the frequency of the clock signal for the display system that is output from the clock generation unit 19, based on the periods of the horizontal and vertical synchronizing signals for the display system that is output from the mode discrimination unit 100. As a result of this signal being output to the display control unit 16, the display control unit 16 starts to read out the image data.

The processing time calculation unit 102 calculates the processing time (Tdo shown in FIG. 3) of the display control unit 16 by multiplying the period of the horizontal synchronizing signal for the display system that is output from the mode discrimination unit 100 by the number of valid data lines within one frame. This processing time does not include an invalid data period (blanking period) within one frame. The processing time calculation unit 102 also calculates time from the timing of starting processing in the image generation unit 14 until when a complete interrupt for writing to the memory 15 is given, both being generated synchronously with the image sensing system synchronizing signal, as the processing time (Tio shown in FIG. 3) of the image generation unit 14. Furthermore, the processing time calculation unit 102 calculates the processing time for one line by dividing the processing time of the image generation unit 14 by the number of lines to be processed by the image generation unit 14.

A processing time comparison unit 103 compares the processing time Tio of the image generation unit 14 and the processing time Tdo of the display control unit 16 that are calculated by the processing time calculation unit 102. A phase difference setting unit 104 sets a phase difference of the image sensing system synchronizing signal with respect to the display system synchronizing signal, in accordance with the result of comparison performed by the processing time comparison unit 103.

A synchronizing reference determination unit 200 in the synchronization timing generation unit 21 sets the synchronizing reference in accordance with the result of comparison performed by the processing time comparison unit 103. Note that when the synchronizing reference is set, an image sensing system synchronizing signal generation unit 201 generates the image sensing system synchronizing signal by dividing the frequency of the clock signal for the image sensing system that is output from the clock generation unit 19. The periods of the horizontal and vertical synchronizing signals for the image sensing system that are read out from the mode discrimination unit 100 and the synchronizing reference determined by the synchronizing reference determination unit 200 are input as information for generating the image sensing system synchronizing signal. Furthermore, the phase difference that is set by the phase difference setting unit 104 and the display system synchronizing signal generated by the display system synchronizing signal generation unit 101 are input. The image sensing system synchronizing signal, which is obtained by shifting the synchronizing reference set by the synchronizing reference determination unit 200 by the phase difference, is generated based on the above information and output to the image sensor 12 such that the delay time from when the image sensor 12 generates the image data of the object until when the image data is displayed is shortest.

Figure 3:
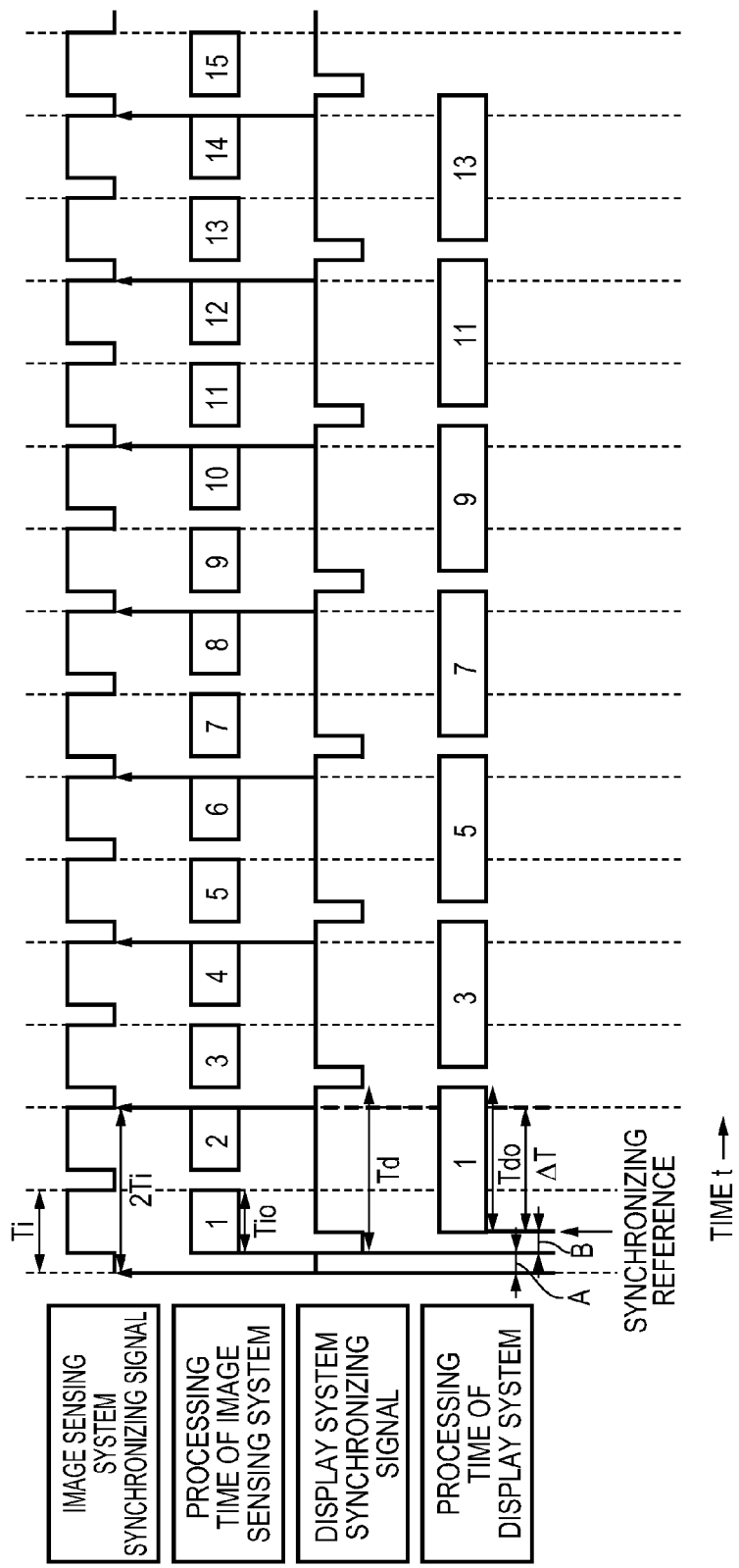
FIG. 3 is a timing chart for illustrating a first synchronization method according to the embodiment.

Next, a first synchronization method according to the embodiment of the present invention will be described using the timing chart in FIG. 3. The first synchronization method is a synchronization method executed in the case where the processing time of the display system is longer than the processing time of the image sensing system. The image sensing system synchronizing signal is output to the image sensor 12 at a period of one frame Ti of the image sensing system. Note that the processing time of the image sensing system is the processing time Tio of the image generation unit 14 calculated by the processing time calculation unit 102. The display system synchronizing signal is output to the LCD 17 at a period of time Td for one frame of the display system. Note that the processing time of the display system is the processing time Tdo of the display control unit 16 calculated by the processing time calculation unit 102. In this description, it is assumed that the relationship between Ti and Td is 2Ti=Td.

First, the synchronizing reference is set to the start of processing in the display system, and thereafter, the image sensing system synchronizing signal is generated by shifting the synchronizing reference by a phase difference. The method for calculating the phase difference is as follows. Initially, time from when the image sensing system synchronizing signal is controlled until when display is started is calculated by adding time A from when one period of the image sensing system is started until when processing of an image signal is started in the image generation unit 14 and processing time B of the image sensing system for one line. Then, the phase difference $\Delta T$ is obtained by subtracting the above-obtained time A+B from two periods 2Ti of the image sensing system. The image sensing system synchronizing signal generation unit 201 generates the image sensing system synchronizing signal based on the obtained phase difference $\Delta T$.

By thus obtaining the phase difference $\Delta T$, processing in the display system can be started at the timing of the end of processing in the image sensing system for one line, and the delay time from when the image sensor generates the image data of the object until when the image data is displayed can be shortened. Note that although the processing time B of the image sensing system for one line is used here, the present invention is not limited thereto, and processing time for a predetermined volume of image data with which the delay time can be shortened may also be used.

Although the relationship between Ti and Td is 2Ti=Td in the above description, the present invention is not limited thereto. The phase difference $\Delta T$ need only be obtained such that, in the case where Ti<Td, processing in the display system is started at the timing of the end of processing of a predetermined volume of image data in the image sensing system. Note that this processing for obtaining the phase difference $\Delta T$ may be performed once for every output of a mode signal, and may be performed for every frame number at which the ratio between Ti and Td is a ratio of whole numbers (e.g., for every 5Ti or 2Td in the case where 5Ti=2Td).

Figure 4:
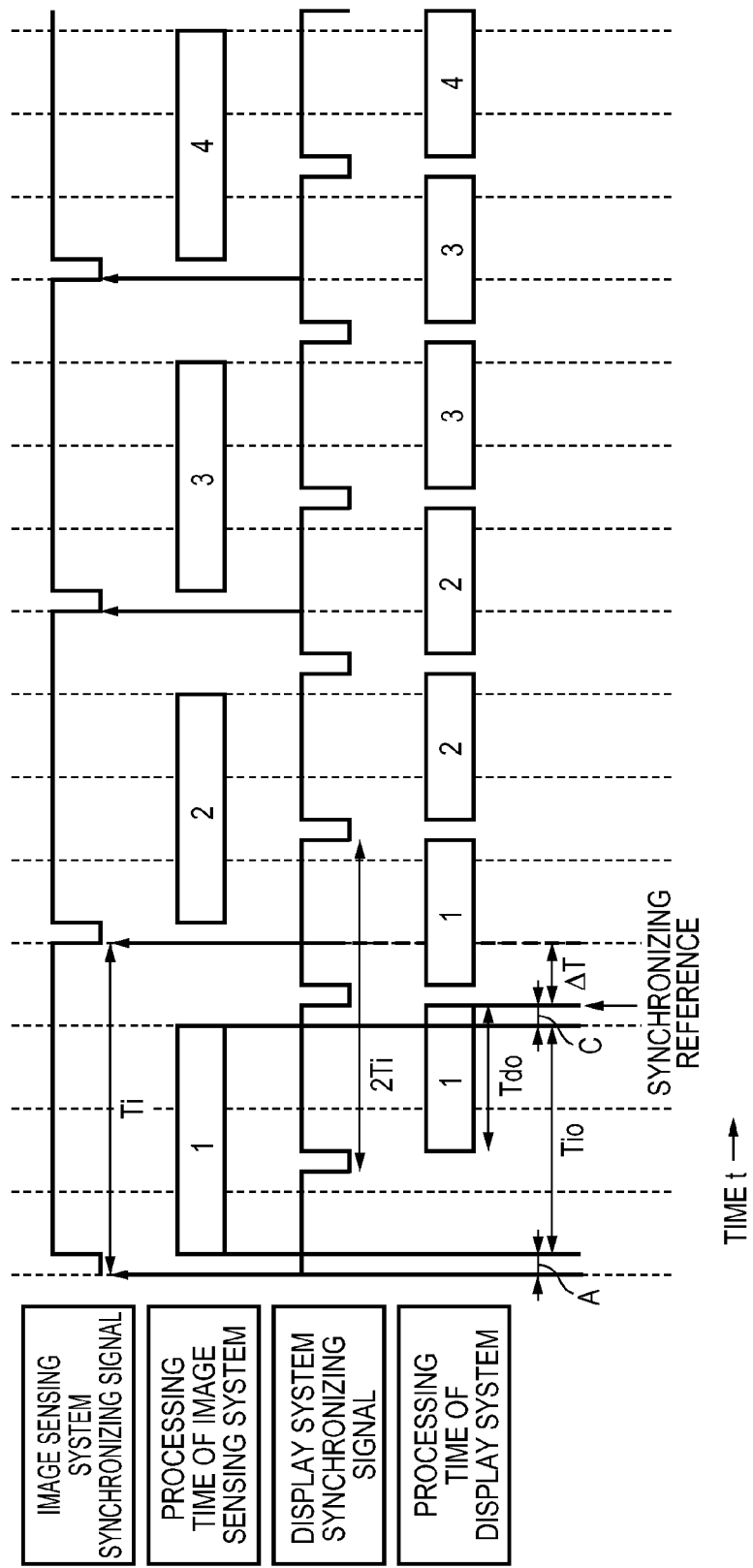
FIG. 4 is a timing chart for illustrating a second synchronization method according to the embodiment.

Next, a second synchronization method according to the embodiment of the present invention will be described using the timing chart in FIG. 4. The second synchronization method is a synchronization method executed in the case where the processing time of the image sensing system is longer than the processing time of the display system. Unlike the first synchronization method, it is assumed here that the relationship between Ti and Td is Ti=2Td. Note that the type of signal is the same as that in the first synchronization method, and the description thereof will be omitted here.

First, the synchronizing reference is set to the completion of processing in the display system, and thereafter, the image sensing system synchronizing signal is generated by shifting the synchronizing reference by the phase difference. In the method for calculating the phase difference, the time A from when one period of the image sensing system is started until when processing of a video signal is started in the image generation unit 14, the processing time Tio of the image sensing system, and processing time C of the display system for one line are added. Thus, time from when the image sensing system synchronizing signal is controlled until when display is completed is calculated. Then, the phase difference ΔT is obtained by subtracting the above-obtained time A+C+Tio from one period Ti of the image sensing system. The image sensing system synchronizing signal generation unit 201 generates the image sensing system synchronizing signal based on the obtained phase difference ΔT.

By thus obtaining the phase difference ΔT, the image data for one line that has not been displayed is left in the memory 15 when processing in the image sensing system for one frame ends. Processing in the display system can be thereby prevented from being performed prior to processing in the image sensing system, and accordingly, the delay time from when the image sensor generates the image data of the object until when the image data is displayed can be shortened. Note that although the processing time C of the display system for one line is used here, the present invention is not limited thereto, and processing time for a predetermined volume of image data with which the delay time can be shortened may also be used.

Although the relationship between Ti and Td is Ti=2Td in the above description, the present invention is not limited thereto. The phase difference ΔT need only be obtained such that, in the case where Ti≥Td, the predetermined volume of image data has not undergone display processing and is left in the memory 15 at the timing of the end of processing in the image sensing system for one frame. Note that this processing for obtaining the phase difference ΔT may be performed once for every output of a mode signal, and may be performed for every frame number at which the ratio between Ti and Td is a ratio of whole numbers (e.g., for every 3Ti or 5Td in the case where 3Ti=5Td).

Figure 5:
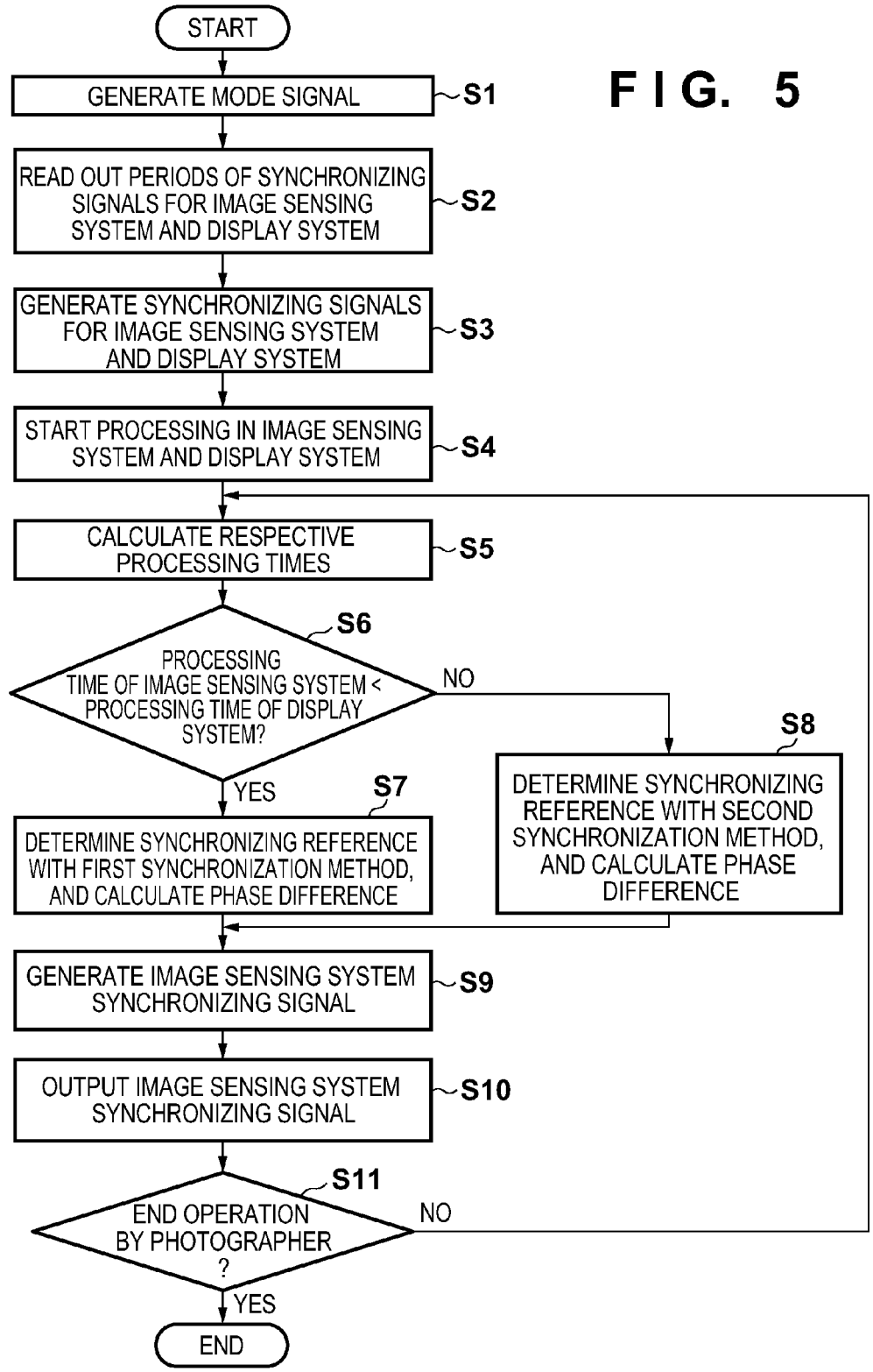
FIG. 5 is a flowchart showing processing from switching of a photographing mode until outputting of an image sensing system synchronizing signal to an image sensor.

FIG. 5 is a flowchart from when the operation unit 18 generates a mode signal in accordance with an operation of a photographer until when the image sensing system synchronizing signal generation unit 201 outputs the image sensing system synchronizing signal to the image sensor 12. This control is executed by the CPU 20 and the synchronization timing generation unit 21.

In step S1, first, the operation unit 18 generates a mode signal based on the drive mode of the image sensor 12 that is specified from the photographing mode selected by a user operation, and the display format such as NTSC or PAL, which is a video signal standard, and outputs the generated mode signal to the mode discrimination unit 100. Next, in step S2, the mode discrimination unit 100 reads out the periods of the horizontal and vertical synchronizing signals for the image sensing system and the display system from the table that is recorded in advance in the mode discrimination unit 100, based on the mode signal that is output from the operation unit 18.

In step S3, the display system synchronizing signal generation unit 101 receives the clock for the display system that is generated by the clock generation unit 19 and the periods of the horizontal and vertical synchronizing signals for the display system that are read out from the mode discrimination unit 100, and generates the display system synchronizing signal. The image sensing system synchronizing signal generation unit 201 receives a clock for the image sensing system that is output by the clock generation unit 19 and the periods of the horizontal and vertical synchronizing signals for the image sensing system that are read out from the mode discrimination unit 100, generates the image sensing system synchronizing signal, and outputs the image sensing system synchronizing signal to the image sensor 12. In step S4, the image generation unit 14 and the display control unit 16 start processing, based on the image sensing system synchronizing signal and the display system synchronizing signal that are generated by the image sensing system synchronizing signal generation unit 201 and the display system synchronizing signal generation unit 101.

In step S5, the processing time calculation unit 102 calculates the processing time of the image generation unit 14 (processing time of the image sensing system) from information regarding the timing of starting processing in the image generation unit 14 and a complete interrupt for the writing to the memory 15 that is output from the image generation unit 14, both being generated synchronously with the image sensing system synchronizing signal. Further, the processing time of the display system is calculated by multiplying the period of the horizontal synchronizing signal for the display system that is read out from the mode discrimination unit 100 by the number of valid data lines within one frame. In step S6, the processing time comparison unit 103 receives the processing time of the image sensing system and the processing time of the display system from the processing time calculation unit 102, and determines whether or not the processing time of the image sensing system is shorter than the processing time of the display system. If shorter, the processing proceeds to step S7, and if the processing time of the image sensing system is longer than or equal to the processing time of the display system, the processing proceeds to step S8.

In step S7, with the first synchronization method, the synchronizing reference determination unit 200 sets the timing of starting processing in the display system as the synchronizing reference. The processing time calculation unit 102 calculates the processing time of the image sensing system for one line by dividing the obtained processing time of the image sensing system by the number of all lines, and outputs the calculated processing time to the phase difference setting unit 104. Then, as described above with reference to FIG. 3, the phase difference setting unit 104 adds the time A from when two periods 2Ti of the image sensing system are started until when the image generation unit 14 starts processing and the processing time B of the image sensing system for one line, and sets time ΔT, which is obtained by subtracting the sum of the above addition from the two periods 2Ti of the image sensing system as the phase difference.

On the other hand, in step S8, with the second synchronization method, the synchronizing reference determination unit 200 sets the timing of completion of processing in the display system as the synchronizing reference. Then, as described above with reference to FIG. 4, the phase difference setting unit 104 adds the time A from when one period Ti of the image sensing system is started until when the image generation unit 14 starts processing, the processing time Tio of the image sensing system, and the processing time B of the display system for one line. Then, the phase difference setting unit 104 sets the time ΔT obtained by subtracting the sum of the addition from one period Ti of the image sensing system as the phase difference.

Next, in step S9, the image sensing system synchronizing signal generation unit 201 generates the image sensing system synchronizing signal by applying the phase difference that is set by the phase difference setting unit 104 in step S7 or S8 to the synchronizing reference determined by the synchronizing reference determination unit 200. In step S10, the image sensing system synchronizing signal generation unit 201 outputs the generated image sensing system synchronizing signal to the image sensor 12.

In step S11, when an end operation is performed by the photographer, the operation unit 18 outputs an end signal, and ends generation of the synchronizing signal. If the end operation is not performed, the processing returns to step S5.

As described above, according to the present embodiment, the image sensing system synchronizing signal is generated by taking the length correlation between the processing times of the image sensing system and the display system into consideration, and thereby, the delay time from when the image sensor 12 generates the image data of the object until when the image data is displayed can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-036205, filed on Feb. 26, 2013 which is hereby incorporated by reference herein in its entirety.

What is claimed is:

1. An image capturing apparatus comprising:
an image sensor configured to convert received light into an electric signal;
a generation unit configured to generate a synchronizing signal for driving the image sensor;
an image generation unit configured to perform image processing for generating image data using the electric signal obtained from the image sensor;
a storage unit configured to store the image data;
a display unit; and
a display control unit configured to perform display processing for reading out the image data stored in the storage unit and displaying the image data on the display unit,
wherein the generation unit
controls a phase of the synchronizing signal for the image sensor by regarding a start of the display processing by the display control unit as a synchronizing reference such that the display processing is started at a timing of the image generation unit performing the image processing on a predetermined volume of image data, in a case where a first period that is a frame period of the image sensor is shorter than a second period that is a frame period of the display control unit, and
controls the phase of the synchronizing signal for the image sensor by regarding completion of the display processing for one frame as the synchronizing reference such that a predetermined volume of image data that has not been processed by the display control unit is left in the storage unit when the image processing for one frame is finished by the image generation unit, in a case where the first period is longer than or equal to the second period.

2. The image capturing apparatus according to claim 1, wherein the predetermined volume of image data is image data for one line.

3. The image capturing apparatus according to claim 1, further comprising:
an operation unit configured to change at least one of a photographing mode of the image sensor or a display format of the display unit,
wherein the generation unit performs the control of the phase if at least one of the photographing mode and the display format is changed by the operation unit.

4. The image capturing apparatus according to claim 1, wherein the generation unit controls the phase for every frame number at which a ratio between the frame period of the image sensor and the frame period of the display unit is a ratio of whole numbers.

5. A method for controlling an image capturing apparatus including:
an image sensor configured to convert received light into an electric signal; a generation unit configured to generate a synchronizing signal for driving the image sensor; an image generation unit configured to perform image processing for generating image data using the electric signal obtained from the image sensor; a storage unit configured to store the image data; a display unit;
and a display control unit configured to perform display processing for reading out the image data stored in the storage unit and displaying the image data on the display unit, the method comprising:
a step of controlling a phase of the synchronizing signal for the image sensor by regarding a start of the display processing by the display control unit as a synchronizing reference such that the display processing is started at a timing of the image generation unit performing the image processing on a predetermined volume of image data, in a case where a first period that is a frame period of the image sensor is shorter than a second period that is a frame period of the display control unit, by the generation unit; and
a step of controlling the phase of the synchronizing signal for the image sensor by regarding completion of the display processing for one frame as the synchronizing reference such that a predetermined volume of image data that has not been processed by the display control unit is left in the storage unit when the image processing for one frame is finished by the image generation unit, in a case where the first period is longer than or equal to the second period, by the generation unit.

6. An image capturing apparatus comprising:
an image sensor configured to convert received light into an electric signal;
a generation unit configured to generate a synchronizing signal for driving the image sensor;
an image generation unit configured to perform image processing for generating image data using the electric signal obtained from the image sensor;
a storage unit configured to store the image data;
a display unit; and
a display control unit configured to perform display processing for reading out the image data stored in the storage unit and displaying the image data on the display unit,
wherein the generation unit controls a phase of the synchronizing signal for the image sensor such that the display processing is started at a timing of the image generation unit performing the image processing on a predetermined volume of image data, in a case where a first period that is a frame period of the image sensor is shorter than a second period that is a frame period of the display control unit, and
the generation unit calculates the phase of the synchronizing signal every predetermined number of frames, and does not calculate the phase of the synchronizing signal at frames between the predetermined number of frames.

7. The image capturing apparatus according to claim 6, wherein the predetermined number of frames is a ratio of whole numbers corresponding to a ratio between the first period and the second period.

8. An image capturing apparatus comprising:
   an image sensor configured to convert received light into an electric signal;
   a generation unit configured to generate a synchronizing signal for driving the image sensor;
   an image generation unit configured to perform image processing for generating image data using the electric signal obtained from the image sensor;
   a storage unit configured to store the image data;
   a display unit; and
   a display control unit configured to perform display processing for reading out the image data stored in the storage unit and displaying the image data on the display unit,
   wherein the generation unit controls a phase of the synchronizing signal for the image sensor such that a predetermined volume of image data that has not been processed by the display control unit is left in the storage unit when the image processing for one frame is finished by the image generation unit, in a case where a first period that is a frame period of the image sensor is longer than or equal to the second period that is a frame period of the display control unit, and
   the generation unit calculates the phase of the synchronizing signal every predetermined number of frames, and does not calculate the phase of the synchronizing signal at frames between the predetermined number of frames.

9. The image capturing apparatus according to claim 8, wherein the predetermined number of frames is a ratio of whole numbers corresponding to a ratio between the first period and the second period.

10. A method for controlling an image capturing apparatus including: an image sensor configured to convert received light into an electric signal; a generation unit configured to generate a synchronizing signal for driving the image sensor; an image generation unit configured to perform image processing for generating image data using the electric signal obtained from the image sensor; a storage unit configured to store the image data; a display unit; and a display control unit configured to perform display processing for reading out the image data stored in the storage unit and displaying the image data on the display unit, the method comprising:
   a step of controlling a phase of the synchronizing signal for the image sensor such that the display processing is started at a timing of the image generation unit performing the image processing on a predetermined volume of image data, in a case where a first period that is a frame period of the image sensor is shorter than a second period that is a frame period of the display control unit,
   wherein the phase of the synchronizing signal is calculated every predetermined number of frames, and the phase of the synchronizing signal is not calculated at frames between the predetermined number of frames.

11. A method for controlling an image capturing apparatus including: an image sensor configured to convert received light into an electric signal; a generation unit configured to generate a synchronizing signal for driving the image sensor; an image generation unit configured to perform image processing for generating image data using the electric signal obtained from the image sensor; a storage unit configured to store the image data; a display unit; and a display control unit configured to perform display processing for reading out the image data stored in the storage unit and displaying the image data on the display unit, the method comprising:
   a step of controlling a phase of the synchronizing signal for the image sensor such that a predetermined volume of image data that has not been processed by the display control unit is left in the storage unit when the image processing for one frame is finished by the image generation unit, in a case where a first period that is a frame period of the image sensor is longer than or equal to the second period that is a frame period of the display control unit,
   wherein the phase of the synchronizing signal is calculated every predetermined number of frames, and the phase of the synchronizing signal is not calculated at frames between the predetermined number of frames.

* * * * *